United States Patent [19]

Seymour et al.

[11] 4,263,364

[45] Apr. 21, 1981

[54] STAMPABLE REINFORCED THERMOPLASTIC POLYESTER SHEETS

[75] Inventors: Robert W. Seymour; James C. Weaver, both of Kingsport; Benny W. Wright, Bluff City, all of Tenn.

[73] Assignee: Eastman Kodak Company, Rochester, N.Y.

[21] Appl. No.: 103,806

[22] Filed: Dec. 14, 1979

[51] Int. Cl.³ ............................................. B32B 27/34
[52] U.S. Cl. ................................... 428/287; 428/284; 428/285; 428/286; 428/298; 428/430
[58] Field of Search ............... 428/284, 285, 286, 287, 428/298, 300, 430

[56] References Cited

U.S. PATENT DOCUMENTS

| | | | |
|---|---|---|---|
| 2,961,365 | 11/1960 | Sroog | 428/230 |
| 3,765,998 | 10/1973 | Oswald et al. | 428/338 |
| 3,993,828 | 11/1976 | McCorsley | 428/285 |

Primary Examiner—James J. Bell
Attorney, Agent, or Firm—Malcolm G. Dunn; Daniel B. Reece, III

[57] ABSTRACT

The object of the invention is to provide a stampable sheet of reinforced thermoplastic material, the sheet being composed of a plurality of layers of polyester material and a plurality of layers of reinforcing material integrally formed together, the central layer or layers of polyester material being of more slowly crystallizing material than the outer layers. The polyester layers are all substantially amorphous and are made of polyester polymers selected from poly(ethylene terephthalate), selected copolymers of poly(ethylene terephthalate), poly(1,4-cyclohexylenedimethylene terephthalate), selected copolymers of poly(1,4-cyclohexylenedimethylene terephthalate), blends of poly(ethylene terephthalate) and any of the aforementioned selected copolymers, and blends of poly(1,4-cyclohexylenedimethylene terephthalate) and any of the aforementioned selected copolymers, The central polyester layer or layers are polyester polymers selected from the aforementioned selected copolymers and blends.

Another object of the invention is to provide a stamped sheet from the stampable sheet of reinforced thermoplastic material, the stamped sheet having a heat deflection temperature under 264 psi. load greater than $T_m - 50°$ C.

15 Claims, No Drawings

STAMPABLE REINFORCED THERMOPLASTIC POLYESTER SHEETS

TECHNICAL FIELD

Our invention relates to stampable reinforced thermoplastic polyester sheets and particularly to glass-reinforced thermoplastic polyester sheets of laminate or composite construction for forming automotive parts as well as for other applications, the forming being accomplished by the use of various sheet metal-forming techniques, such as by stamping apparatus; and to stamped sheets from the stampable reinforced thermoplastic polyester sheets.

Automotive companies have been changing from the use of die-cast metal to the use of reinforced plastics for many different parts of an automobile in order to take advantage of the resulting reduced weight. For large parts these reinforced plastics have been in the form of sheet molding compounds (SMC) which are based on thermoset resins which require a chemical reaction to occur in order to cure the plastic. Generally the forming equipment requires apparatus more simple than that required to injection mold parts of comparable size. Many disadvantages exist, however, such as long cycle time in order to cure the thermoset resin, poor surface finish and complexity of resin compositions.

BACKGROUND ART

Representative, for instance, of some kinds of development activities occurring in the past 10 years for reducing the weight of automobiles and thereby enabling the autoist to be more conservative of fuel, would appear to be the following.

According to the May 1969 issue of *Autoproducts*, the G.R.T.L. Company, a joint development venture of PPG Industries, Inc. and Union Carbide Corporation, was formed (about 1968) to produce a family of glass-reinforced thermoplastic sheets called "Azdel" which could be formed on conventional metal-stamping apparatus for the purpose of meeting the automobile industry's need for high-speed productivity, for example, 180 to 360 parts per hour with a single press. The Azdel glass-reinforced thermoplastic sheet can be formed in one operation into shapes that take four or more separate stamping operations when working with a sheet of steel. The Azdel sheet is preheated in an infrared oven to about 400° F. (about 204° C.), then fed to a press and formed between cooled matched metal dies. The operation, according to the article, is scrap-free and as the stamped Azdel sheet comes from the mold it has no flash or trim, and holes and notches can be formed in the stamping operation. Shapes can be stamped from Azdel sheets that would be impossible in steel; and in some cases an assembly of several parts in steel can be redesigned so that it can be made in one part from an Azdel sheet.

Also according to the Jan. 22, 1968 issue of *Chemical and Engineering News*, the Azdel glass-reinforced thermoplastic sheets reportedly could be made from styrene acrylonitrile copolymer (42% glass reinforced), polyvinyl chloride (36% glass reinforced), polypropylene (44% glass reinforced) or other resins. The Azdel sheet contains generally about 40% glass fiber by weight. Reinforced polypropylene has a heat distortion temperature of 327° F. (about 164° C.); styrene acrylonitrile copolymer, 255° F. (about 124° C.); and polyvinylchloride, 221° F. (about 105° C.). A given part can be formed from a variety of blank sizes, such as an 84-mil-thick hood can be formed from a 150-mil-thick by 100 sq.-in.-blank or from a 125-mil thick by 121-sq.-in.-blank (*SPE Journal*, September 1972-Vol. 28, pages 38–42).

Further, in the September 1976 issue of *Plastics World*, page 53, there was a later announcement that a new grade of Azdel sheet based on PBT (polybutylene terephthalate) thermoplastic polyester reinforced with 30 weight percent of continuous glass fiber mat was being offered. These Azdel sheets were formed in a stamping operation after being preheated to 450° F.–500° F. (about 232° C. to about 260° C.).

Allied Chemical Corporation, for instance, produces a stampable nylon 6 composite sheet which is registered under the name STX, and has a combination of about 50% nylon 6 resin, about 30% glass fiber reinforcements and about 20% fillers. The composite sheet must be heated to a temperature above its melting point before it can be stamp formed, according to an article in the March 1979 issue of *Plastics Engineering* (pages 47–49).

In every instance mentioned above, the preheating of the composite sheet apparently has to take place at or above the melting point of the thermoplastic material being used in the sheet. Such heating, of course, requires a significant amount of energy that has to be used for each sheet. Also, heating at or above the melting point means that greater care must be exercised in transporting a sheet in its melt or above-melt state as from the infrared oven to the forming or stamping press.

One thermoplastic material that does not appear to be given as much mention in the literature for structural purposes as other thermoplastic materials is the polyester, poly(ethylene terephthalate). It is noted, for instance, in U.S. Pat. No. 3,547,891 that there is disclosed a thin film material or sheet material (about 7.5 to 10 mils in thickness) of poly(ethylene terephthalate), that has been vacuum heat formed, starting and ending essentially in the amorphous state. This amorphous final state would apparently be suitable for the final product, as for use in blister packages, as mentioned in the patent, but not for use in the final form of automobile parts. Another patent, U.S. Pat. No. 3,496,143, discloses a process for vacuum deep-drawing of poly(ethylene terephthalate) sheet material, which must have a solution viscosity [as determined in a 1% solution of the poly(ethylene terephthalate) in meta-cresol at 25° C.] of about 1.7 to about 2.0 and a degree of crystallization of at least 5% up to about 25%. Neither this sheet material nor the one disclosed in U.S. Pat. No. 3,547,891 is a reinforced material or one of laminate construction. U.S. Pat. No. 3,496,143 specifies that its vacuum-formed product is not amorphous and that it has a higher degree of crystallinity than the initial material being molded; the molded material also being considered as having a degree of crystallinity in the range of 5% to 25%.

U.S. Pat. No. 3,765,998 discloses a high-impact resin sheet which is formable in shaping apparatus held at ambient temperature and concerns a glass mat having a glass fiber length of at least one inch, impregnated with poly(ethylene terephthalate) having a weight average molecular weight from about 5,000 to about 45,000. The sheets are preheated from about 240° C. to about 280° C., and are then transferred to a mold or press where they are cooled slowly under pressure to develop crystallinity (Examples 1 through 8). Examples 9 and 10 speak of chilling the laminate sheet, but since there is no indication of the rate of chilling taking place the state of crystallinity cannot be determined. In any event the patent teaches preheating to around the melt temperature for all examples. There is an indication in the specification that the "PET" [poly(ethylene terephthalate)] polymers have a level of crystallinity of from about 20% to about 60% as determined by X-ray techniques (column 3, lines 51–57), but it is not clear whether or not this statement has reference to the polymer in the pellet form prior to impregnation into the sheet or to the polymer when in the sheet form.

An advantage of the use of thermoplastic resin instead of the thermoset resin is that the former need only to cool below its crystallization temperature before a stamping press can be reopened and the part removed. A thermoset resin part must be given time for a chemical reaction to occur in order to cure the part before it can be removed from a stamping press.

Another advantage is that a thermoplastic part can be recycled, if need be, by reheating, whereas a thermoset part cannot be recycled by reheating.

DISCLOSURE OF INVENTION

In accordance with the present invention, we provide reinforced thermoplastic polyester sheets which can be rapidly quenched from the melt to a stable amorphous state. The quenched, amorphous sheets may then be stamp-formed at temperatures that are below the melting point ($T_m$) of the polyester but above its glass transition ($T_g$) temperature, or the quenched amorphous sheets may be stored and then stamp-formed at another time. In this manner, therefore, considerable energy will be saved as compared to some of the prior art processes mentioned above involving the necessity of heating to or above the melt temperature of the polymer involved. Also the sheet may be more easily handled in moving it to a forming or stamping apparatus than one heated at or above the melt temperature. Further, flat amorphous sheets can be stored indefinitely at ambient temperatures until needed and then transported to a forming or stamping press. The resulting formed or stamped part retains the shape of the mold in the press and possesses an overall high set of properties such as surface appearance, heat distortion temperature, flexural and impact strength which qualify it for use in both appearance and structural applications. The resulting sheet will thus find utility in such applications as exterior automotive parts, which are exposed to elevated paint oven temperatures.

The reinforced thermoplastic polyester sheet thus may be produced and then reduced to an amorphous state and subsequently stamped and crystallized simultaneously at a temperature below the melting point of the polyester but above the glass transition temperature.

More specifically the invention is directed to a reinforced stampable thermoplastic polyester sheet of laminate construction, the center layer or layers of which is or are comprised of a more slowly crystallizing polymer than the outer layers of the sheet. This construction reduces the need to rapidly quench the core of the sheet so as to form the amorphous sheet and thus enables higher production rates and the production of thicker amorphous sheets.

Still more specifically, the invention is directed to a stampable sheet of reinforced thermoplastic material, the sheet being constructed of a plurality of layers of polyester material and a plurality of layers of reinforcing material integrally formed together. The central layer or layers of polyester material is or are made of more slowly crystallizing material than the outer layers of polyester material. All of the polyester layers of the stampable sheet are substantially amorphous and are made of polyester polymers selected from the group consisting of (a) poly(ethylene terephthalate); (b) copolymers of poly(ethylene terephthalate) having about 5 to about 50 mole percent of 1,4-cyclohexanedimethanol, neopentyl glycol, 2,2,4,4-tetramethyl-1,3-cyclobutanediol, bisphenol A, isophthalic acid, or 1,4-cyclohexanedicarboxylic acid; (c) poly(1,4-cyclohexylenedimethylene terephthalate); (d) copolymers of poly(1,4-cyclohexylenedimethylene terephthalate) having about 20 to about 50 mole percent of ethylene glycol, neopentyl glycol, 2,2,4,4-tetramethyl-1,3-cyclobutanediol, bisphenol A, isophthalic acid, or 1,4-cyclohexanedicarboxylic acid; (e) blends of poly(ethylene terephthalate) with greater than 35 weight percent of any of the preceding-mentioned copolymers of item (b) or item (d); and (f) blends of poly(1,4-cyclohexylenedimethylene terephthalate) with greater than 35 weight percent of any of preceding-mentioned copolymers of item (b) or item (d). The outer polyester layers have a minimum crystallization half-time upon heating of one minute or less, and the central polyester layer or layers is or are selected from the polymers identified in items (b), (d), (e) or (f) above and has or have a minimum crystallization half-time upon heating of greater than one minute, with the minimum crystallization half-time being that as measured with respect to each individual layer of the polyester material.

The crystallization half-time is defined as the length of time required at a given temperature for an originally amorphous polymer sample to crystallize 50% of the amount to which it eventually crystallizes at that temperature. For example, poly(ethylene terephthalate) crystallizes at about 60% at 180° C. and never 100%. Thus only 50% of 60%, or 30%, crystallinity is obtained after one crystallization half-time. The minimum crystallization half-time is that half-time which corresponds to the minimum point of the curve when half-time is plotted against temperature.

Values reported as "crystallization half-times" are measured in the following manner. A sample of the polyester is placed in the sample pan of a Perkin-Elmer DSC-2 differential scanning calorimeter. An amount of fine mesh $Al_2O_3$ sufficient to minimize transient responses is placed in the reference pan. The sample is then heated to a temperature above the melting point of the polyester (for example about 285° C. for PET). When the sample is thoroughly melted, it is quickly cooled to the desired crystallization temperature and allowed to crystallized isothermally while the crystallization exotherm is recorded as a function of time. Zero time is taken as the moment at which the instrument reaches the chosen crystallization temperature. The exothermic response as recorded by the instrument will pass through a maximum and the time at which that maximum occurs is a good approximation of the crystallization half-time. For the purposes of these measurements, the time at the maximum will be taken as equivalent to the crystallization half-time. The minimum crystallization half-time is found by performing the above experiment at a number of crystallization temperatures and plotting the half-times as a function of crystallization temperature. This curve will pass through a minimum and the half-time at that minimum is the minimum crystallization half-time.

The polyester material may comprise polyesters having inherent viscosities of about 0.3 to about 0.7; inherent viscosity being determined by a concentration of 0.5 grams polymer in 100 milliliter solvent (60 percent by weight phenol and 40 percent by weight tetrachloroethane), the polymer being dissolved at 125° C. and being measured at 25° C.

The thickness of the laminated sheet may range from about 40 mils to about 250 mils, and preferably about 50 mils to about 150 mils, and still more preferably about 60 mils to about 100 mils.

The reinforcement level may range from about 20 to about 50 percent by weight, and preferably about 30 to about 40 percent by weight. The reinforcement may be glass fiber which may be in the form of fibers, standard continuous or chopped mat, glass fiber cloth, woven rovings, indefinite lengths of glass fiber strands or combinations of any of the preceding mentioned forms.

BEST MODE FOR CARRYING OUT THE INVENTION

The reinforced stampable thermoplastic polyester sheets are made by laminating alternating layers of polymer or polymer film and reinforcing fiberglass or glass mat by heating in a compression press or continuous laminating press to temperatures of 260° C. or higher. The sheet is rapidly cooled under pressure to prevent any significant crystallization.

The reinforced sheet comprises at least three layers of polymer alternated with at least two layers of glass fiber (in whatever form) to give an overall composition of about 20 to about 50 percent reinforcement. The middle layers of this composition are made of a polyester-based material which will not crystallize during the sheet production and may or may not crystallize during subsequent stamping operations. The outer layers of this composition are made of more crystallizable polyesters which may be quenched from the melt to form a substantially amorphous sheet, but which will still crystallize under the conditions used to stamp the final part.

For stamping, the substantially amorphous sheets may be dried and preheated at temperatures of about 100° C., then formed in a mold maintained at about 160° C. to about 180° C. The outer layers of the sheet, at least, become crystalline, causing the sheet to retain the shape of the mold.

This invention may be illustrated by the following examples, although it will be understood that these examples are included merely for purposes of illustration and are not intended to limit the scope of the invention.

EXAMPLES

1. Poly(ethylene terephthalate) film (PET), I.V. 0.67, minimum crystallization half-time=40 seconds, 45 mil thickness, copoly(69/31 ethylene terephthalate/1,4-cyclohexylene-dimethylene terephthalate) film (abbreviated "copoly 69/31"), I.V. 0.75, minimum crystallization half-time=2650 minutes, 45 mil thickness, and a fiberglass continuous strand mat, 2 oz./sq. ft., were cut into pieces 8"×8". For the control composition "A," beginning with outer layers of PET film (45 mil total), alternating layers of film, and mat were placed in a compression molding die measuring ⅛"×8"×8" to produce a composite as illustrated below:

A.    ---------- 45 mil PET
      xxxxxxxxxx glass mat
      ---------- 45 mil PET
      xxxxxxxxxx glass mat
      ---------- 45 mil PET For composition "B," the middle layer of 45 mil PET was replaced with 45 mil copoly(69/31 ethylene terephthalate/1,4-cyclohexylenedimethylene terephthalate) film (as described above), abbreviated as copoly 69/31, as shown below:

B.    ---------- 45 mil PET
      xxxxxxxxxx glass mat
      ---------- 45 mil copoly 69/31
      xxxxxxxxxx glass mat
      ---------- 45 mil PET Each composition in turn was placed between two metal plates and inserted in a Wabash compression molding press preheated to 270° C. Slight pressure was applied to the composite until the polymer began to flow. Maximum pressure of 24 tons on a three-inch diameter ram was then applied to the composite for two minutes.

The compressed ⅛"-thick sheet was then removed from the press and immediately placed in a cold water bath where the PET sheet was quenched to a substantially amorphous state. To prepare samples for mechanical testing purposes, the composites were cooled gradually under pressure in the press to below 69° C. (the $T_g$ of PET) to afford crystallization. ASTM specimens were cut from the crystalline sheets and tested by the procedures listed in the tables.

The crystallized all-PET sheet, composition "A," contained 30 weight percent glass reinforcement. It possessed high strength properties, specifically flexural and impact strength, and a high heat distortion temperature (Table 1).

The crystallized PET sheet containing the amorphous copoly 69/31 middle layer, composition "B," also contained 30 weight percent glass reinforcement. It possessed a significantly lower specific gravity than composition "A" but maintained a high level of strength properties. Unexpectedly the flexural modulus remained high and the heat distortion temperature remained unchanged (Table 1).

To demonstrate formability, the substantially amorphous sheets of compositions "A" and "B" were in turn placed in a match-mated mold in a compression molding press. The mold had been preheated to 180° C. Slight pressure was applied to the sheet until good heat transfer had occurred. The sheet was then formed and crystallized for two minutes under a pressure of two tons on a two-inch diameter ram. The formed, crystalline parts were then removed from the mold and cooled to 23° C. Both parts from compositions "A" and "B" retained the shape of the mold.

TABLE 1

| Property, Units | ASTM Method | 30% Glass Mat Reinforced Sheets | |
|---|---|---|---|
| | | Composition "A" All PET | Composition "B" Copoly 69/31 Middle Layer |
| Specific gravity @ 23° C. | D-792 | 1.587 | 1.391 |
| Deflection temperature, °C. @ 264 psi. | D-648 | 230° | 230° |
| Flexural modulus of elasticity, psi. | D-790 | 754,000 | 740,000 |
| Flexural strength, psi. | D-790 | 19,500 | 17,000 |
| Tensile strength at fracture, psi. | D-638 | 14,100 | 11,000 |
| Notched Izod impact strength, ft.-lb./in. of notch @ 23° C. | D-256 | 11 | 6 |
| Unnotched Izod impact strength, ft.-lb./in. of width @ 23° C. | D-256 | 14 | 9 |
| Hardness R scale | D-785 | 115 | 112 |
| L scale | D-785 | 106 | 73 |
| M scale | D-785 | 85 | 56 |

A composition "C" was prepared in the same manner as described for compositions "A" and "B" whereby the middle layer was replaced with 45 mils of copoly(87/13 ethylene terephthalate/1,4-cyclohexylenedimethylene terephthalate) film, abbreviated "copoly 87/13." Copoly 87/13 is less crystallizable than PET but more crystallizable than copoly 69/31. It has a minimum crystallization half-time=9 minutes. Copoly(87/13 ethylene terephthalate/1,4-cyclohexylenedimethylene terephthalate) film, I.V. 0.80, 45 mil thickness was used to produce a composite as shown:

| C. | ---------- 45 mil PET |
| | xxxxxxxxxx glass mat |
| | ---------- 45 mil copoly 87/13 |
| | xxxxxxxxxx glass mat |
| | ---------- 45 mil PET |

The composition was prepared, tested and formed in the same manner previously described. Composition "C" contained 30 weight percent glass reinforcement and its properties (Table 2) compare favorably to those obtained for compositions "A" and "B." Although copoly 87/13 is more crystallizable than copoly 69/31, under the conditions used to prepare the composite it remains in an essentially amorphous state and the properties of composition "C" are very similar to those of composition "B," including the reduced specific gravity. The decreased crystallization rate of the middle layer relative to the outer PET layers will again allow higher continuous production rates to be obtained.

TABLE 2

| Property, Units | ASTM Method | 30% Glass Mat Reinforced Sheet Composition "C" Copoly 87/13 Middle Layer |
|---|---|---|
| Specific gravity @ 23° C. | D-792 | 1.398 |
| Deflection temperature, °C. @ 264 psi. | D-648 | 230° C. |
| Flexural modulus of elasticity, psi. | D-790 | 750,000 |
| Flexural strength, psi. | D-790 | 18,400 |
| Tensile strength at fracture, psi. | D-638 | 12,500 |
| Notched Izod impact strength, ft.-lb./in. of notch @ 23° C. | D-256 | 9 |
| Unnotched Izod impact strength, ft.-lb./in. of width @ 23° C. | D-256 | 13 |
| Hardness R scale | D-785 | 114 |
| L scale | D-785 | 101 |

TABLE 2-continued

| Property, Units | ASTM Method | 30% Glass Mat Reinforced Sheet. Composition "C" Copoly 87/13 Middle Layer |
|---|---|---|
| M scale | D-785 | 78 |

The benefits of compositions "B" and "C" are a reduced specific gravity (and thus lower part weight) and the increase in production rate which would be possible in a continuous process. The increased production rate results from the fact that the center layer, from which heat transfer is the slowest, does not have to be cooled as quickly to obtain an amorphous product, as it will not crystallize readily. These examples demonstrate that these benefits are obtained without reducing the useful properties of the sheet (high strength, high heat deflection temperature and good dimensional stability).

3. Compositions similar to "B" and "C" can also be produced by employing poly(1,4-cyclohexylenedimethylene terephthalate) (PCDT) for the outer layers. For example, PCDT film, I.V. 0.75, minimum crystallization half-time=10 seconds, 45 mil thickness, copoly(69/31 ethylene terephthalate/1,4-cyclohexylenedimethylene terephthalate) film (copoly 69/31), I.V. 0.75, minimum crystallization half-time=2650 minutes, 45 mil thickness, and a fiberglass continuous strand mat, 2 oz./sq.ft., is cut into pieces 8"×8". For the control composition "D" the following composite is made:

| D. | ---------- 45 mil PCDT |
| | xxxxxxxxxx glass mat |
| | ---------- 45 mil PCDT |
| | xxxxxxxxxx glass mat |
| | ---------- 45 mil PCDT |

For composition "E" the middle layer of PCDT is replaced with 45 mil copoly 69/31 as shown below:

| E. | ---------- 45 mil PCDT |
| | xxxxxxxxxx glass mat |
| | ---------- 45 mil copoly 69/31 |
| | xxxxxxxxxx glass mat |
| | ---------- 45 mil PCDT |

The compositions are prepared as described for compositions "A" and "B," with the changes that the molding press is preheated to 300° C. Also the compressed sheets to be tested are cooled in the press to below 90° C. (the $T_g$ of PCDT) to afford crystallization.

The rapidly crystallizing all-PCDT sheet, composition "D," possesses properties slightly lower than the all-PET sheet with the notable exception of a higher heat deflection temperature. The lower specific gravity of the PCDT sheet relative to PET may be advantageous as it leads to reduction in weight of the final part (Table 3).

However, a further significant reduction in specific gravity is obtained by utilizing the amorphous copoly 69/31 middle layer, composition "E." The high level of strength properties are maintained and the heat deflection temperature remains unchanged (Table 3).

The PCDT-based sheets are formed in the same manner as the PET-based sheets, compositions "A," "B" and "C," by preheating the mold to 220° C. The combination of PCDT outer layers and decreased crystallization rate produced by the amorphous middle layer results in a sheet which may be produced under very high continuous production rates and possesses a significant decrease in specific gravity and increase in deflection temperature.

TABLE 3

| | | 30% Glass Mat Reinforced Sheets | |
|---|---|---|---|
| Property, Units | ASTM Method | Composition "D" All PCDT | Composition "E" Copoly 69/31 Middle Layer |
| Specific gravity @ 23° C. | D-792 | 1.462 | 1.287 |
| Deflection temperature, °C. @ 264 psi. | D-648 | 270° | 270° |
| Flexural modulus of elasticity, psi. | D-790 | 620,000 | 605,000 |
| Flexural strength, psi. | D-790 | 16,500 | 15,000 |
| Tensile strength at fracture, psi. | D-638 | 12,200 | 10,000 |
| Notched Izod impact strength, ft.-lb./in. of notch @ 23° C. | D-256 | 10 | 6 |
| Unnotched Izod impact strength, ft.-lb./in. of width @ 23° C. | D-256 | 12 | 8 |
| Hardness R scale | D-785 | 112 | 110 |
| L scale | D-785 | 103 | 70 |
| M scale | D-785 | 80 | 52 |

PERMISSIBLE VARIATIONS

The glass mat plies may be oriented in different directions to orient the fiber lengths and obtain the desired property. In addition, combinations of different types of mats, such as continuous and chopped strand, may be used. Chopped random fibers and/or fillers may also be added between plies or by preextrusion with the polyester. Different types of mat and/or fibers may also be employed, such as synthetic polymeric materials, carbon or graphite.

It may be desirable that additives be incorporated in the polymeric plies to impart characteristics such as mold release, stability or flame retardancy.

The thickness of the overall sheet may range from about 40 mils to about 250 mils. Of this thickness, at least 10% but not more than 40% is composed of the more slowly crystallizing inner layer material.

APPLICATIONS

The stampable reinforced thermoplastic polyester sheet would find applications principally in the automotive industry in exterior parts, under-the-hood applications requiring high heat distortion temperatures and in nonappearance parts. It would also find utility in farm equipment and business equipment and computer housings.

The invention has been described in detail with particular reference to preferred embodiments thereof, but it will be understood that variations and modifications can be effected within the spirit and scope of the invention.

We claim:

1. A stampable sheet of reinforced thermoplastic material, said sheet comprising a plurality of layers of polyester material and a plurality of layers of reinforcing material integrally formed together, the central layer or layers of polyester material being of more slowly crystallizing material than the outer layers;

said polyester layers being substantially amorphous and made of polyester polymers selected from the group consisting of a. poly(ethylene terephthalate);

b. copolymers of poly(ethylene terephthalate) having about 5 to about 50 mole percent of 1,4-cyclohexanedimethanol, neopentyl glycol, 2,2,4,4-tetramethyl-1,3-cyclobutanediol, bisphenol A, isophthalic acid or 1,4-cyclohexanedicarboxylic acid;

c. poly(1,4-cyclohexylenedimethylene terephthalate);

d. copolymers of poly(1,4-cyclohexylenedimethylene terephthalate) having about 20 to about 50 mole percent of ethylene glycol, neopentyl glycol, 2,2,4,4-tetramethyl-1,3-cyclobutanediol, bisphenol A, isophthalic acid, or 1,4-cyclohexanedicarboxylic acid;

e. blends of poly(ethylene terephthalate) with greater than 35 weight percent of any of said copolymers in item (b) or item (d); and f. blends of poly(1,4-cyclohexylene dimethylene terephthalate) with greater than 35 weight percent of any of said copolymers in item (b) or item (d);

said outer polyester layers having a minimum crystallization half-time upon heating of one minute or less, and said central polyester layer or layers being selected from the polymers identified in items b, d, e or f above and having a minimum crystallization half-time upon heating of greater than one minute, the minimum crystallization half-time being that as measured with respect to each individual layer of said polyester material.

2. A stampable sheet as defined in claim 1, wherein said layers of reinforcing material are comprised of glass fiber.

3. A stampable sheet as defined in claim 1, wherein said sheet comprises at least three layers of said polyester material and at least two layers of glass fiber, said polyester layers being alternated with said glass fiber layers.

4. A stampable sheet as defined in claim 1, wherein said outer polyester layers comprise poly(ethylene terephthalate) having an inherent viscosity of about 0.3 to about 0.7 and a minimum crystallization half-time of about 40 seconds; said central polyester layer or layers comprise copoly(69/31 ethylene terephthalate/1,4-cyclohexylenedimethylene terephthalate) having an inherent viscosity of about 0.60 and a minimum crystallization half-time of about 2650 minutes; and said layers of reinforcing material comprise glass fibers; said inherent viscosity being determined by a concentration of 0.5 grams polymer in 100 milliliter solvent (60% by weight phenol and 40% by weight tetrachloroethane), the polymer being dissolved at 125° C. and being measured at 25° C.

5. A stampable sheet as defined in claim 1, wherein said outer polyester layers comprise poly(ethylene terephthalate) having an inherent viscosity of about 0.3 to about 0.7 and a minimum crystallization half-time of about 40 seconds; said central polyester layer or layers comprise copoly(87/13 ethylene terephthalate/1,4-cyclohexylenedimethylene terephthalate) having an inherent viscosity of about 0.65 and a minimum crystallization half-time of about 9 minutes; and said layers of reinforcing material comprise glass fibers; said inherent viscosity being determined by a concentration of 0.5 grams polymer in 100 milliliter of solvent (60% by weight phenol and 40% by weight tetrachloroethane), the polymer being dissolved at 125° C. and being measured at 25° C.

6. A stampable sheet as defined in claim 1, wherein said central layer or layers comprise a blend of poly(ethylene terephthalate) having about 50% by weight copoly(87/13 ethylene terephthalate/1,4-cyclohexylenedimethylene terephthalate) having an inherent viscosity of about 0.60 and a minimum crystallization half-time of about 1.5 minutes; said inherent viscosity being determined by a concentration of 0.5 grams polymer in 100 milliliter of solvent (60% by weight phenol and 40% by weight tetrachloroethane), the polymer being dissolved at 125° C. and being measured at 25° C.

7. A stampable sheet as defined in claim 1, wherein the overall thickness of said sheet ranges from about 40 to about 250 mils, and said layers of glass fibers comprise about 20 to about 50% by weight of said stampable sheet.

8. A stampable sheet as defined in claim 1, wherein the overall thickness of said sheet ranges from about 50 to about 150 mils, and said layers of glass fibers comprise about 20 to about 50 percent by weight of said stampable sheet.

9. A stampable sheet as defined in claim 1, wherein the overall thickness of said sheet ranges from about 60 to about 100 mils, and said layers of glass fibers comprise about 30 to about 40% by weight of said stampable sheet.

10. A stamped sheet of reinforced thermoplastic material from the stampable sheet of claim 1 and having a heat deflection temperature under 264 psi. load greater than $T_m - 50°$ C.

11. A stamped sheet as defined in claim 10, wherein said layers of reinforcing material are comprised of glass fiber.

12. A stamped sheet as defined in claim 10, wherein said sheet comprises at least three layers of said polyester material and at least two layers of glass fiber, said polyester layers being alternated with said glass fibers.

13. A stamped sheet of reinforced thermoplastic material from the stampable sheet of claim 4.

14. A stamped sheet of reinforced thermoplastic material from the stampable sheet of claim 5.

15. A stamped sheet of reinforced thermoplastic material from the stampable sheet of claim 6.

* * * * *

UNITED STATES PATENT AND TRADEMARK OFFICE
CERTIFICATE OF CORRECTION

PATENT NO. : 4,263,364
DATED : April 21, 1981
INVENTOR(S) : Seymour et al

It is certified that error appears in the above—identified patent and that said Letters Patent is hereby corrected as shown below:

Column 12, in Claim 7, line 9, change "1" to ---2---.

Column 12, in Claim 8, line 14, change "1" to ---2---.

Column 12, in Claim 9, line 19, change "1" to ---2---.

Signed and Sealed this

Eighth Day of December 1981

[SEAL]

Attest:

GERALD J. MOSSINGHOFF

Attesting Officer

Commissioner of Patents and Trademarks